INVENTORS
FREDERICK C. LUNDELL.
CHARLES B. REGAN.
BY D. Anthony Usina
ATTORNEY

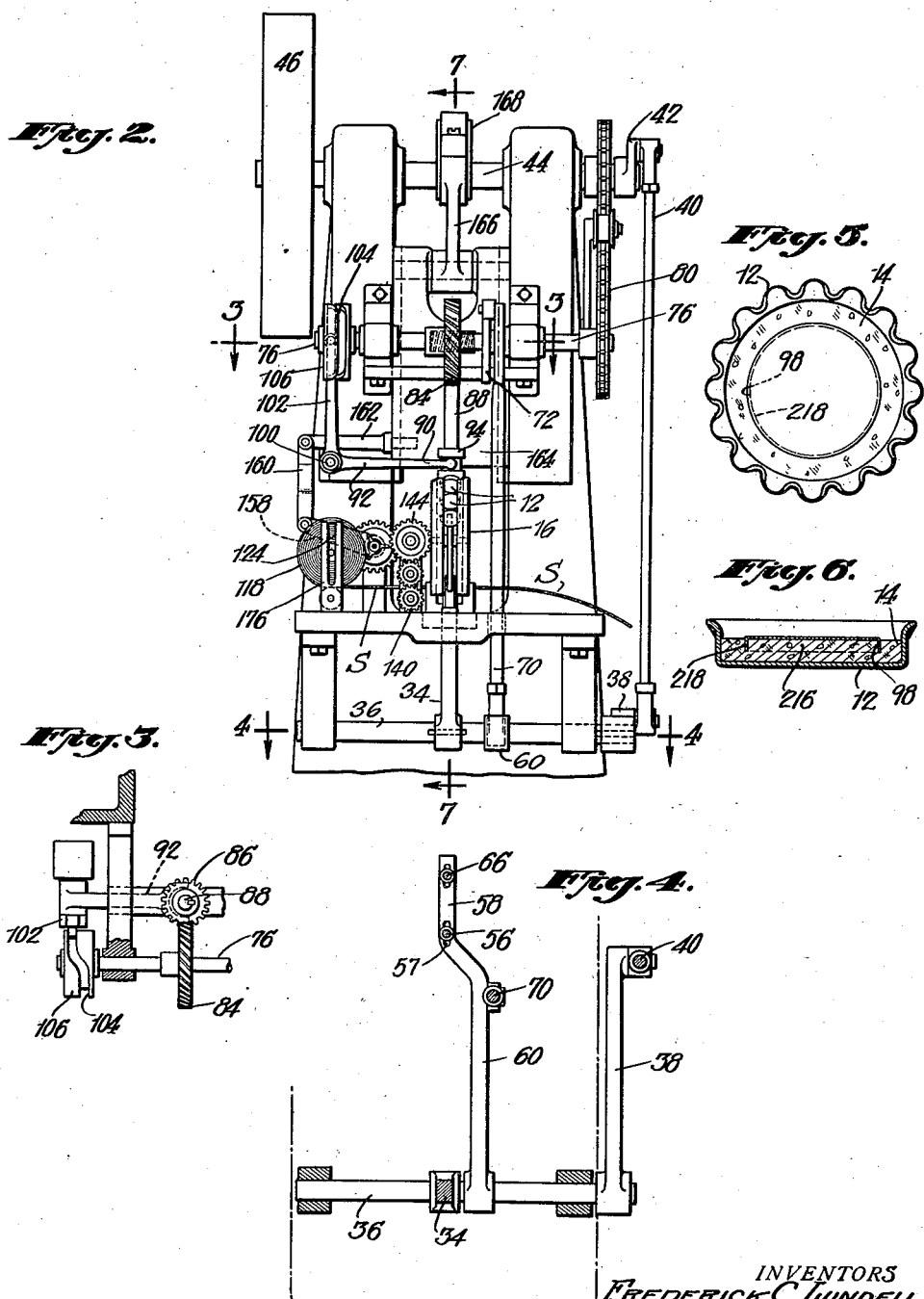

Dec. 10, 1929.    F. C. LUNDELL ET AL    1,738,781
MACHINE FOR APPLYING SEALS TO CUSHION INSERTS
Filed Feb. 25, 1928    5 Sheets-Sheet 3

INVENTORS
FREDERICK C. LUNDELL.
BY CHARLES B. REGAN.
ATTORNEY

Dec. 10, 1929.  F. C. LUNDELL ET AL  1,738,781
MACHINE FOR APPLYING SEALS TO CUSHION INSERTS
Filed Feb. 25, 1928  5 Sheets-Sheet 4
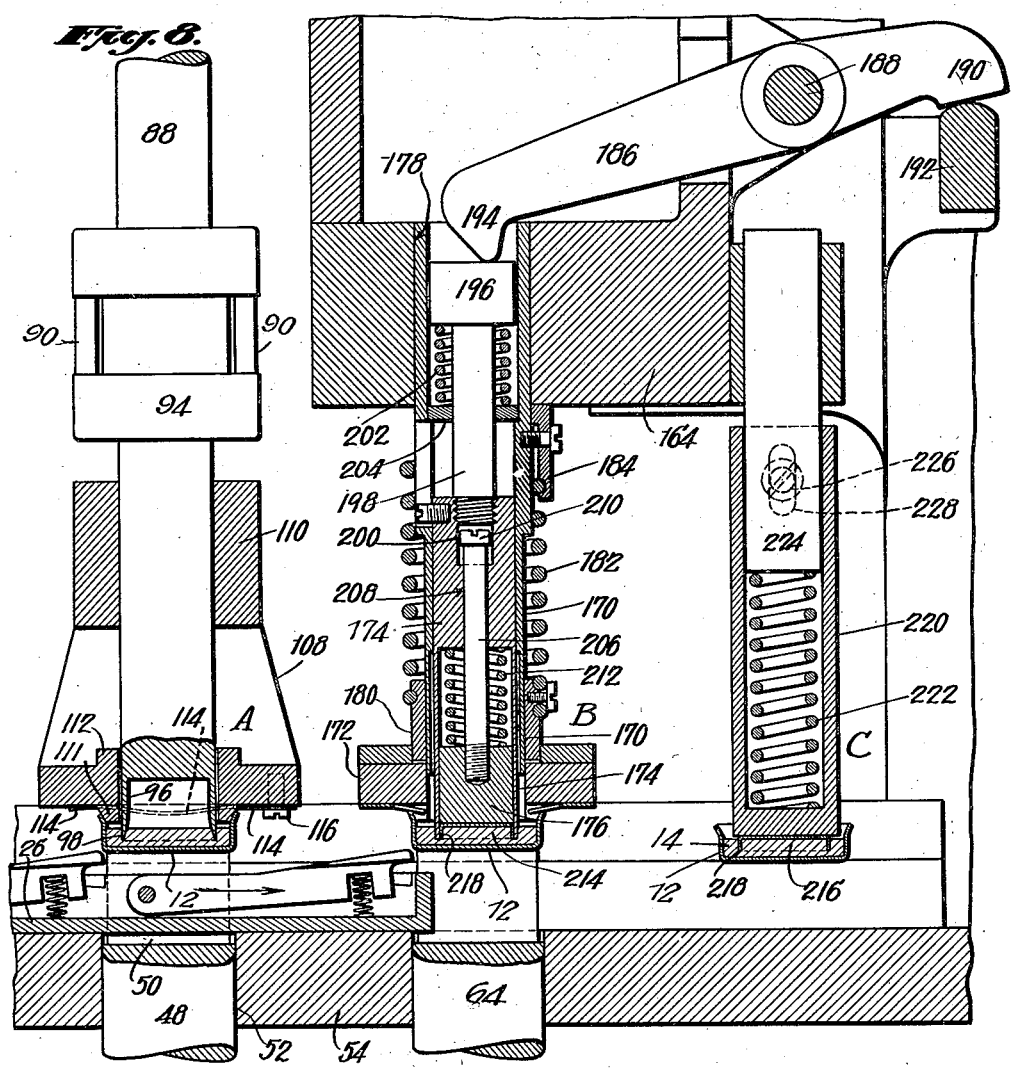
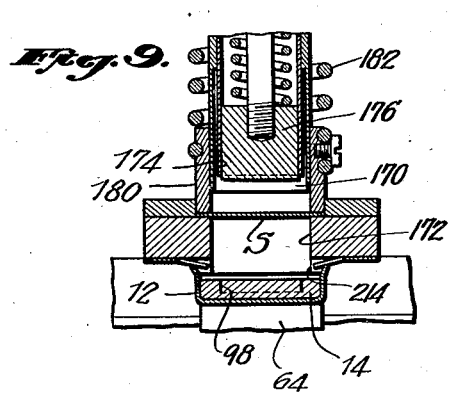
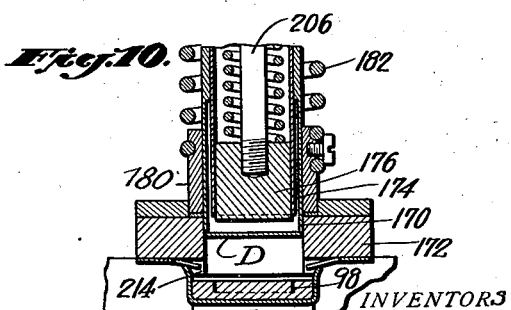
INVENTORS
BY FREDERICK C. LUNDELL.
CHARLES B. REGAN.
ATTORNEY Dec. 10, 1929.  F. C. LUNDELL ET AL  1,738,781
MACHINE FOR APPLYING SEALS TO CUSHION INSERTS
Filed Feb. 25, 1928  5 Sheets-Sheet 5
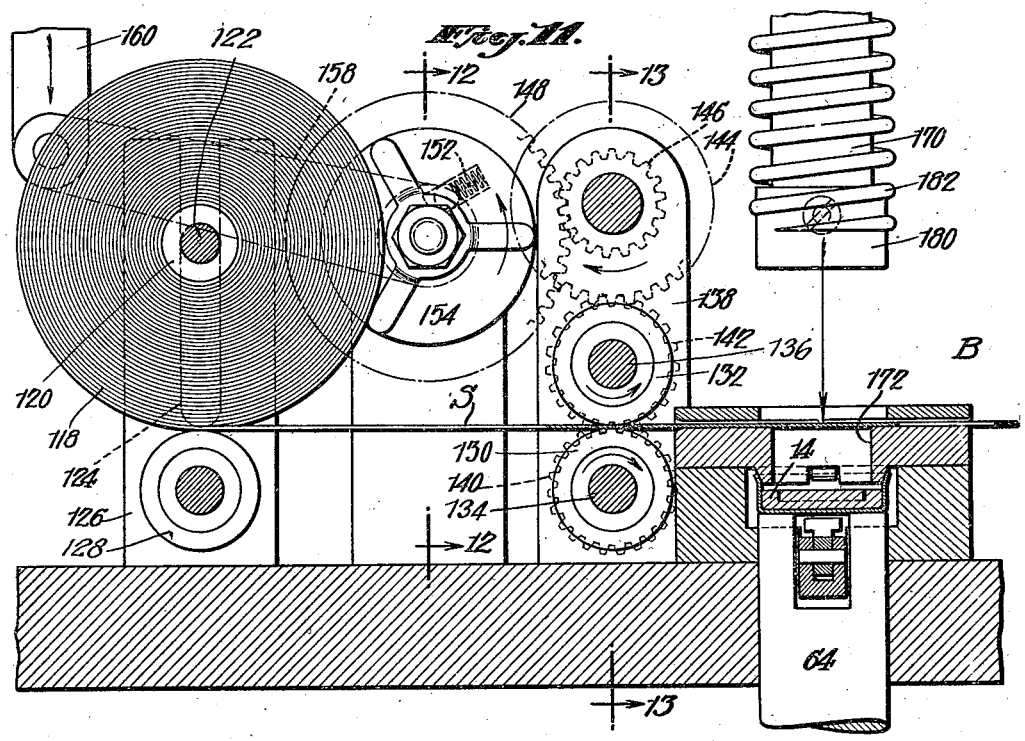
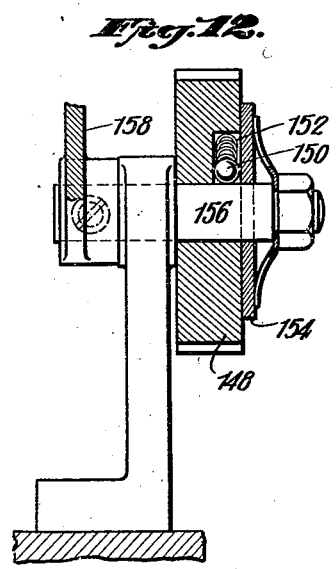
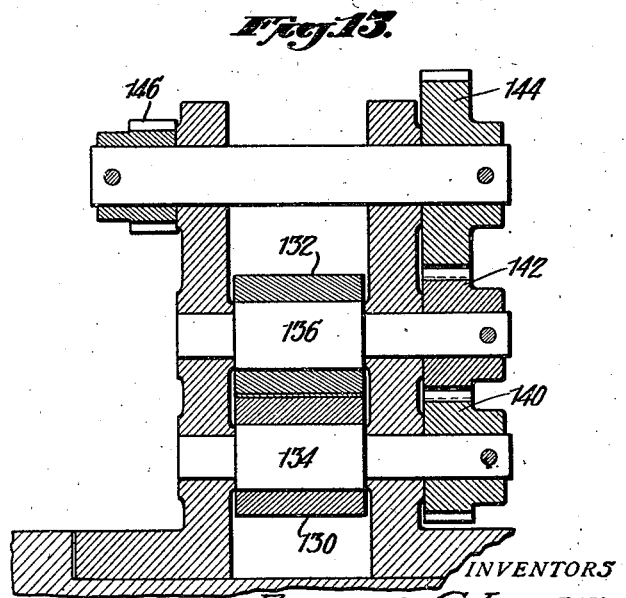
INVENTORS
FREDERICK C. LUNDELL
CHARLES B. REGAN.
BY
ATTORNEY Patented Dec. 10, 1929

1,738,781

UNITED STATES PATENT OFFICE

FREDERICK C. LUNDELL AND CHARLES B. REGAN, OF BROOKLYN, NEW YORK, ASSIGNORS TO THE MILTON CORK COMPANY, OF BROOKLYN, NEW YORK, A CORPORATION OF NEW YORK

MACHINE FOR APPLYING SEALS TO CUSHION INSERTS

Application filed February 25, 1928. Serial No. 256,865.

The machine relates to improvements in a machine for applying seals to cushion inserts such as used in caps for bottles, jars and similar containers. While not limited thereto the machine illustrated is peculiarly well suited for applying a tin foil or white metal seal to the cork insert of a bottle cap having a crimped outer flange.

Heretofore seals have been applied to the cork cushioning members of such bottle caps but the mechanism required for the forming of such seals and inserting them has been of a complex nature due in part to the fact that the seals have been first flanged and then inserted in the preformed groove in the cushioning member of the bottle cap. Such prior machines necessitated extremely careful and accurate aligning of the flanges of the seal with the groove in the cork insert of the cap and also necessitated the provision of some means for spreading the walls of the groove in the cork insert so as to permit insertion of the flanged seal. This has heretofore been necessary because the material of which the seals are formed is usually extremely thin white metal or similar soft stock having little rigidity.

Our improved machine provides for the simultaneous flanging and insertion of the peripheral portion of the seal, hence, there is no necessity of spreading the walls of the annular groove in the insert to permit entrance of a preformed flange.

Our machine also provides improved feeding means and accurate centering devices for positioning the caps in alignment with the tools at the different operative stations.

The invention will be fully apparent from the following specification when read in connection with the accompanying drawings and the features of novelty will be defined with particularity in the appended claims. In the drawings—

Fig. 2 is a view from the left of Fig. 1, the lower portion of the machine being broken away and the feed hopper being omitted in the interest of clearness;

Fig. 3 is a detail horizontal section on line 3—3 of Fig. 2;

Fig. 4 is a detail section on line 4—4 of Fig. 2;

Fig. 5 is a view of a bottle cap having a seal applied thereto;

Fig. 6 is a cross-section of the bottle cap of Fig. 5;

Fig. 8 is a view similar to Fig. 7 but showing certain of the parts in action;

Fig. 9 is a detail section showing another position of certain parts shown in Fig. 8;

Fig. 10 is a similar view showing a further position of the same parts;

Fig. 11 is a sectional view on line 11—11 of Fig. 1;

Fig. 12 is a detail section on line 12—12 of Fig. 11;

Fig. 13 is a detail section on line 13—13 of Fig. 11;

Figure 1:
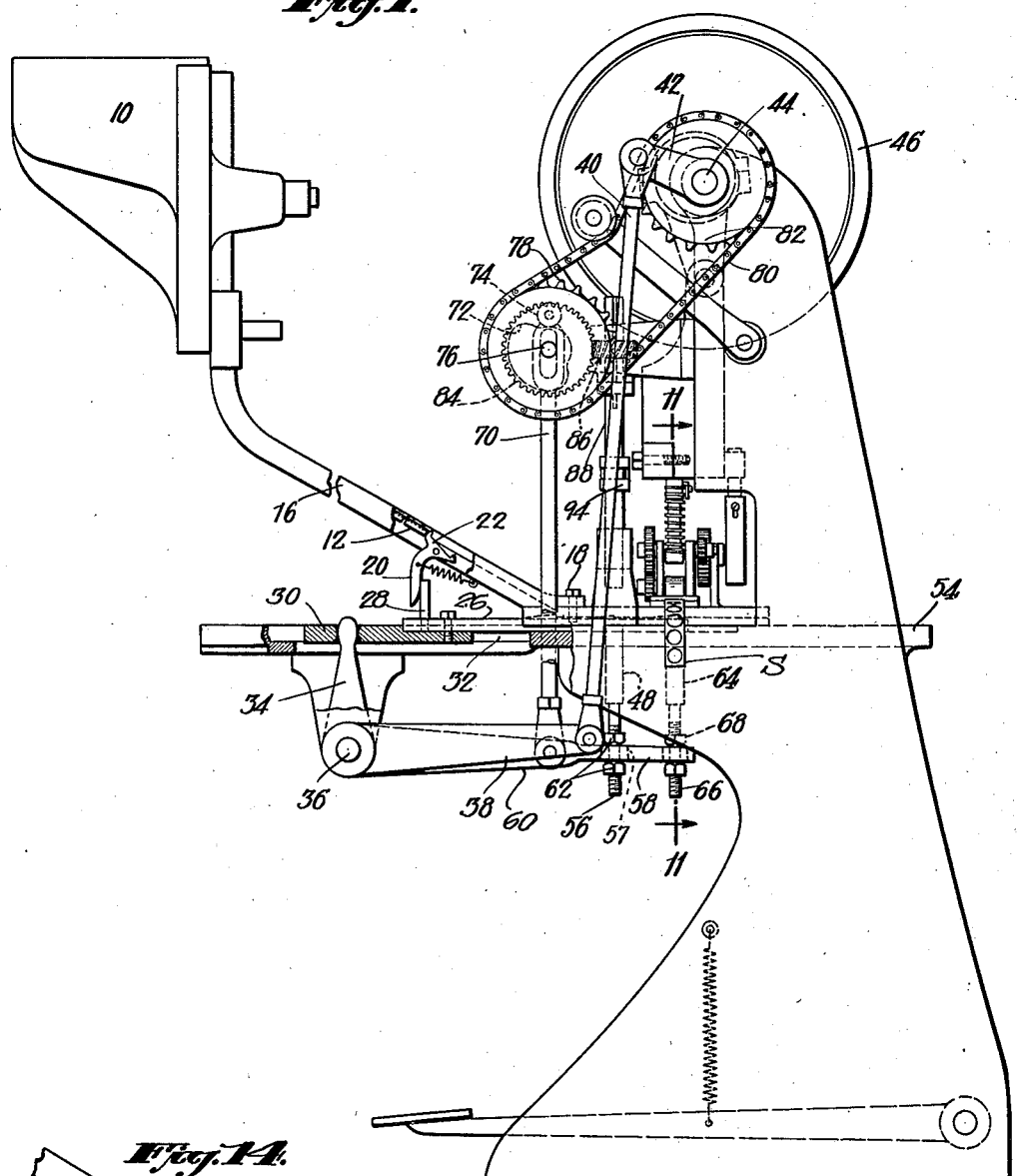
Fig. 1 is a side elevation upon a small scale illustrating an embodiment of the invention.
Figure 14:
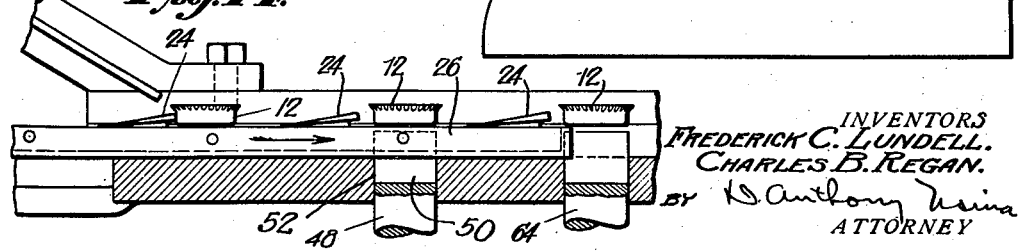
Fig. 14 is a detail longitudinal section through the cap feeding mechanism.

Referring in detail to the drawings, 10 represents a suitable hopper containing a supply of caps 12 such as shown in Figs. 5 and 6 which have been previously provided with cork inserts or cushioning members 14. A guide feed chute 16 is connected to the hopper 10 and terminates at a point 18. Each time a trigger 20 is tripped a dog 22 releases a cap 12 and permits it to slide to a position to be engaged by the rearmost feed dog 24 pivotally secured to a reciprocated feed bar 26. The trigger 20 is actuated by a stud 28 projecting upwardly from the feed bar 26. This feed bar is secured to a plate 30 mounted in suitable guides 32. The plate 30 is periodically reciprocated by means of an arm 34 secured to a rock shaft 36 which carries at its outer end an arm 38 connected by means of a link 40 to a crank 42 secured to the drive shaft 44 of a punch press which is provided with the usual heavy fly-wheel 46.

Figure 7:
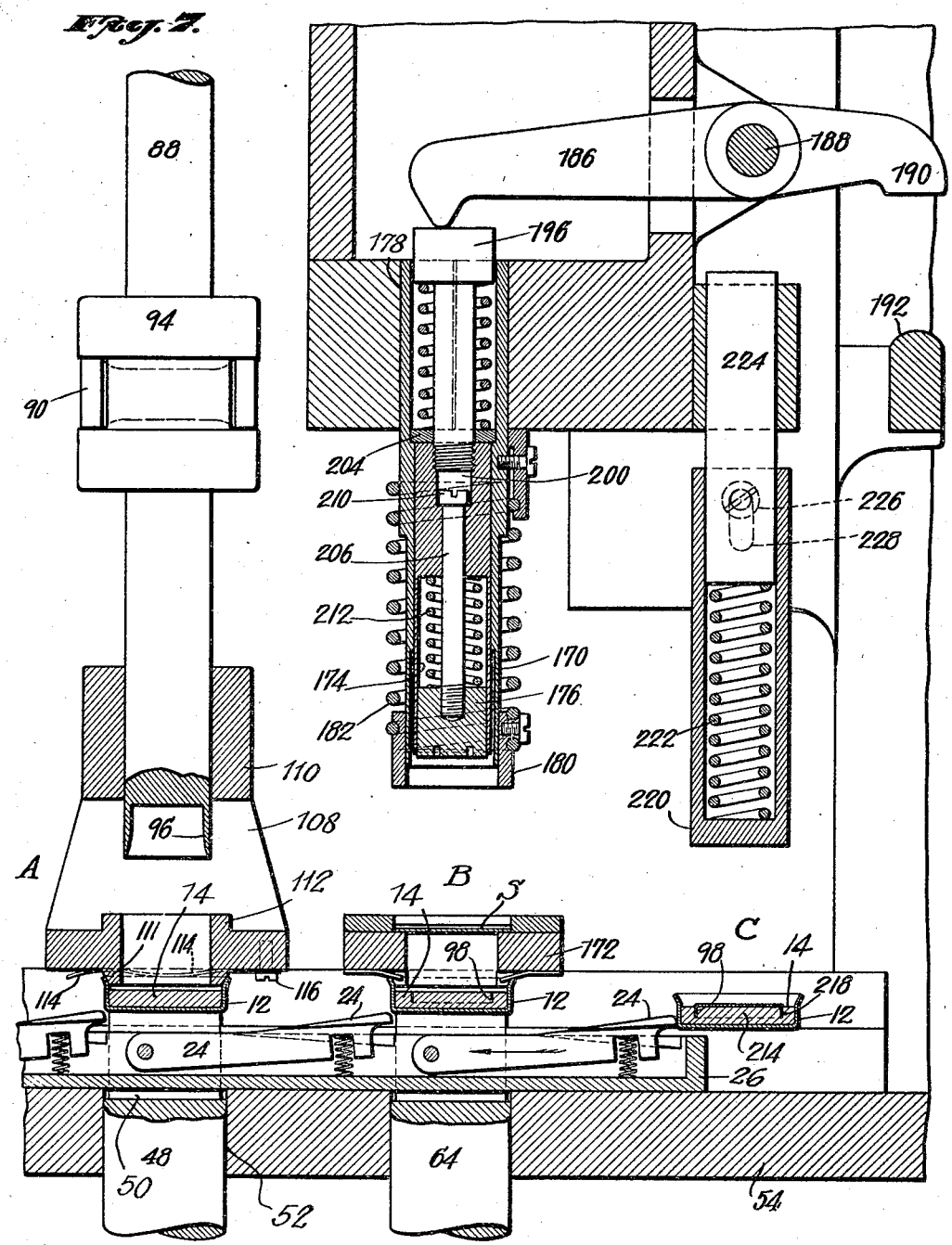
Fig. 7 is an enlarged vertical section taken on the plane indicated by line 7—7 of Fig. 2.

As the feed bar 26 moves to the right as viewed in Figs. 1 to 7, 8 and 14, the spring pressed dogs 24 will advance caps 12 to the operative stations indicated at A, B and C in Figs. 7 and 8.

At the station A means are provided for cutting an annular groove in the cork cushion insert of the cap. At the station B a strip of material is intermittently fed across one face of the cap and a disc of seal stock is punched therefrom, this disc of material being simultaneously flanged over and pressed into the groove in the cork cushion which was formed at the station A. Means are provided at the station B for preventing distortion of the seal upon the withdrawal of the means which inserts the annular portion of the seal in the groove. After insertion of the seal in the groove of the cork cushion, the cap is fed to the station C where pressure is applied to the seal and cushion so as to smooth out any inequalities, thus firmly bonding the seal to the cork insert.

At the station A we provide a plunger 48, the upper end of which is grooved as at 50 to permit the feed bar 26 to travel therethrough. This plunger is guided in a bore 52 formed in the bed 54 of the machine. At its lower end the plunger is provided with a shank 56 which passes through a slot formed in the free end 58 of an arm 60 loosely pivoted on the shaft 36. The shank 56 carries adjusting nuts 62 by means of which the elevation of the plunger may be varied. A similar plunger 64 having a shank 66 and adjusting nuts 68 is also provided at the station B and is actuated by the arm 60. The arm 60 is rocked by means of a link 70, this link receiving its motion from a cam 72 and a follower 74 secured to the upper end of the link as shown in dotted lines in Fig. 1. The cam 72 is secured to a shaft 76 carrying a sprocket 78 driven by means of chain 80 and sprocket 82 secured to the main shaft 44 of the punch press.

The shaft 76 carries a spiral gear 84 which drives a mating gear 86 which has a sliding keyed connection with the shaft 88 which shaft is adapted to be reciprocated vertically by means of the bifurcated end 90 of a bell-crank 92 which engages a grooved collar 94 secured to said shaft 88. At its lower end the shaft 88 carries a circular knife indicated at 96 which is adapted to form an annular groove 98 in the cork insert 14 of the bottle cap 12. The gearing described rotates the circular knife and makes a clean and well defined cut or groove.

The bell-crank 92 is pivoted on a stud 100 and its arm 102 carries at its free end a roller which engages the race 104 of a cam 106 secured to the shaft 76.

For accurately guiding the annular knife 96 at the station A we provide a member 108 having bearing portions 110 and 112. For centering the caps with the axis of the annular knife 96 we provide on the underside of the member 108 a tapered or cone-like extension 111 which is adapted to engage the flaring upper portion of the shell of the cap. This extension 111 also serves to exert a friction grip on the cap so as to prevent the same from rotation when the annular knife is moved into engagement with the cushion insert. To insure that the cap will not stick to the projection 111 when the plunger 48 is withdrawn, we provide suitable spring members, one of which is indicated at 114 in Figs. 7 and 8, these springs being secured to the underside of the member 108 by suitable screws as indicated at 116.

After each cork insert or cushion member 14 of the cap 12 has had an annular groove 98 formed therein, the cap is advanced to the station B upon movement of the bar 26. At the station B means are provided for intermittently feeding a strip S of thin white metal across the path of travel of the caps. And means are also provided for punching out a disc from the strip and bending the peripheral margin over the body of cork within the annular groove. In other words, the flat disc of seal stock is forced or flanged over the center of the cushion member. This substantially simultaneous cutting of the stock and flanging it over and embedding it in the annular groove in the cork cushion, all takes place during a single down stroke of the plunger as will presently appear.

The seal stock as best shown in Fig. 11 is fed intermittently from a stock reel 118 from a spool 120 having a rod 122 extending therethrough which is guided in slots 124 formed in uprights 126, the reel resting on a roller 128. Feed rollers 130 and 132 carried by shafts 134 and 136 are mounted between standards 138—138 and driven through the gears 140, 142, 144, 146 and 148 as shown in Figs. 11 to 13.

The gear 148 is recessed to accommodate a clutch ball 150 which is pressed inwardly by a spring 152, the parts being retained in place by a spring pressed plate 154. The gear 148 is loose on a shaft 156 which has an arm 158 secured to one end thereof. Said arm is connected by a link 160 with a post 162 projecting from a reciprocable slide 164 which is connected by a link 166 with an eccentric 168 carried by the main shaft 44. As thus arranged, it is clear that on each down stroke of the slide 164, the arm 158 will rock the shaft 156 and that the ball clutch will turn gear 148 in the direction of the arrow in Fig. 11, which in turn through the gearing shown will advance the strip of seal stock one step forward. Near the end of the down stroke of the slide 164, a circular hollow punch 170 co-operating with a die 172 cuts a flat circular disc-like piece D out of the strip S (Figs. 9 and 10) and forces it downwardly through the central opening of the die 172 until said disc strikes the upper surface of the cork insert 14, whereupon a central tubular tucker member 174 and a cylindrical presser member 176 come into play. The member 176 holds the central part of the disc D while the tubular tucker member 174 bends the outer part or peripheral margin thereof thus forming a flange and at the same time embedding the flange of the seal within the previously formed annular groove 98 of the cushion member 14. The mechanism is timed so accurately that on the down stroke of the slide 164 the feeding movement of the strip S is completed by the time the punch 170 comes into engagement with the strip and the subsequent downward movement of the slide is so slight that the movement given the feed rollers while the punch is travelling through the strip is negligible.

The punch 170 as best shown in Figs. 7, 8 and 11 is secured in a bore 178 formed in the body of the slide 164. Surrounding the lower part of the punch we provide a clamp sleeve 180 which engages and holds the seal stock S during the punching operation, this member being pressed down by a clamp spring 182 surrounding the punch and secured thereto as indicated at 184. The tucker 174 is slidable relatively to the punch and is arranged to be actuated by a tappet 186 pivoted at 188 when the tail 190 of said tappet strikes a fixed abutment 192 during the down stroke of the slide 164. The end 194 of the tappet coacts with an enlarged head 196 on a stud 198 which is screwed into the bore 200 at the top of the tucker member 174. A compression spring 202 surrounds the shank of the stud 198 and tends to force the tucker 174 up, the lower end of the spring engaging a washer 204 seated against a shoulder formed in the bore of the tubular punch.

The presser 176 is secured to the end of a screw 206 whose shank is slidable in the bore 208 of the tucker and whose head 210 loosely fits the bore 200. A spring 212 surrounds the shank of the screw 206 and tends to force the presser 176 down.

As thus arranged it is clear that when the slide 164 descends, the clamp sleeve 180 will hold the strip S of seal stock while the punch and die coact to sever a circular disc therefrom. See Fig. 10. The disc thus severed will be substantially concentric with the groove previously formed in the cushion member of the cap 12 which is centered on the plunger 64 by a centering projection 214 provided on the underside of the die. Continued downward movement of the punch will position the flat disc on the face of the cushion in overlapping and concentric relationship with the annular groove and the presser 176 will next engage the disc and securely hold it against the cushion while the tappet 186 depresses the tucker 174 and thus bends the outer part of the disc downward (see Fig. 8) over the center part 216 of the cork insert and thus forms the annular flange 218 in situ and embeds it in the previously formed annular groove 98 in one continuous operation and during a single down stroke of the punch. During the withdrawal of the tucker 174 the spring 212 holds the presser 180 firmly against the inserted seal and prevents dislodgment thereof.

After the punch, tucker, presser and related parts recede, the cap with its embedded seal is then fed to the station C as indicated in Fig. 7, and upon the next down stroke of the slide 164, a plunger 220 is brought into contact with the upper surface of the embedded seal to firmly press the seal and interlock its flanged portion with the grooved cushion member.

The plunger 220 as shown in Figs. 7 and 8 is of hollow construction and encloses a compression spring 222, one end of which engages the bottom thereof and the other end of which engages a rod 224 carried by the slide 164. The plunger slidingly engages the rod 224 and its movements are limited by a screw 226 secured to the rod and freely passing through a slot 228 in the shell of the plunger.

In the specification and in the drawings we have exemplified our invention with particular reference to applying seals to cushion inserts of cork or the like carried by bottle caps. It is to be understood, however, that, if desired, the seals may be similarly applied to plain cork discs or cushion members.

Various modifications of the invention may be made by those skilled in the art without departing from the invention as defined in the following claims.

What we claim is:—

1. A machine for applying seals to caps provide with cushion inserts, comprising means for forming an annular groove in the cushion insert of the cap, means for positioning a flat disc in substantially concentric relationship to the groove in the cap and means effective to bend an annular portion of the disc over the central part of the cushion insert to embed the peripheral portion of the disk in the groove in said cushion member.

2. A machine for applying seals to caps provided with cushion inserts comprising means for cutting a grove in the insert of such a cap, a punch and die for cutting a circular disc from a sheet of stock, and a tubular member operable through the die for simultaneously flanging over a peripheral margin of the disc and embedding it in the groove of the cushion insert formed by the first named means.

3. A machine for applying seals to caps provided with cushion inserts comprising means for forming an annular groove in the cushion insert, means for intermittently feeding each cap to a predetermined position, means for positioning a circular flat disc of seal stock in overlapping relationship with the groove in said insert and means for simultaneously bending over and pressing the peripheral margin of said disc into the annular groove in said cushion insert.

4. A machine for applying seals to caps provided with cushion inserts comprising a plurality of operative stations, a feeder for successively positioning said caps at spaced stations, means at one station for grooving the insert of the cap fed thereto, means at another station for feeding a strip of seal stock across one face of the cap and means located at the last named station for severing a piece from the strip of seal stock and forcing a marginal portion thereof into the grooved insert of the cap.

5. A machine for applying seals to caps provided with cushion inserts comprising means for forming an annular groove in the cushion insert, means for forming a circular flat disc of seal stock in alignment with the center of a previously grooved cap and means for simultaneously flanging over and pressing the marginal portion of said flat disc into the annular groove in said cushion insert.

6. A machine for applying seals to caps provided with cushion inserts comprising a grooving member, means for feeding caps to a position opposite said grooving member, means for accurately centering the caps with the grooving member, a punch and die, means for feeding sheet seal stock across the face of the die, means for feeding caps into substantial alignment with said punch and die, means for centering a grooved cap with said punch and die, means for moving the punch relatively to the die so as to shear a disc of metal from the seal stock, means within the punch and movable relatively thereto arranged to flange over the peripheral margin of said disc and force it into the groove of the cushion insert.

7. A machine for applying seals to caps provided with cushion inserts comprising means for forming an annular grove in the cushion insert of a cap, means for forming a circular disc and means for bending the peripheral margin of the disc over the body of the cushion bounded by said annular groove.

8. A machine for applying seals to caps provided with cushion inserts comprising a plurality of stations, means for forming an annular groove in such inserts, means for feeding such caps to said stations, means at one such station for intermittently feeding a strip of seal stock, means for punching circular discs of material out of such stock and means operable through the opening punched from the stock for embedding an annular portion of the disc within the groove of the insert.

9. A machine as defined in claim 4 in combination with means at a separate station for exerting a yielding pressure upon the face of the seal.

10. The machine defined in claim 4 including means for lifting the caps at each operative station and means for accurately centering them at the respective stations.

11. The machine of claim 4 in which the feeder comprises a reciprocating member carrying a plurality of yielding feed dogs.

12. A machine as defined in claim 2 including a reciprocating slide carrying said punch and a reciprocating feeder timed to feed the caps to alignment with said punch in synchronism with the movements of said slide.

13. A machine for applying seals to caps provided with cushion inserts comprising a plurality of operative stations, means for forming an annular groove in the cushion insert, means for advancing a grooved cap to an operative station, means at one of said stations for feeding seal stock, a reciprocating slide supporting said grooving means, and means carried by said slide and operable during a single stroke thereof for shearing a disc from said seal stock and simultaneously bending and inserting the peripheral margin of said disc in the groove of the cushion insert.

14. A machine for applying seals to caps provided with cushion inserts comprising a plurality of stations, means for forming an annular groove in the cushion insert, means for advancing a grooved cap to one of said stations, means at said station for feeding seal stock, a reciprocating slide supporting said grooving means, a punch carried by said slide for cutting a disc from said seal stock, a tucker movable within the punch and arranged to bend and insert the peripheral margin of said disc in the groove in the cushion insert and a yielding member within said tucker arranged to press the seal against said cushion insert while the tucker is being retracted.

15. A machine for applying a metal seal to a cushion of cork or the like comprising a member for forming an annular groove in such a cushion and a tubular member for bending a continuous marginal portion of the disc over the body of the cushion bounded by said annular groove and embedding said continuous portion in said groove.

16. A machine for applying a metal seal to a cushion of cork or the like comprising means for forming an annular groove in such a cushion, means for feeding a strip of seal stock across one face of the cushion, means for severing a seal from said strip, and a single means for bending the peripheral margin of said seal and inserting it in said groove.

17. A machine for applying a metal seal to a cushion of cork or the like comprising means for forming an annular groove in such a cushion, means for positioning a seal in substantially concentric overlapping relationship with said cushion and a single means for bending the peripheral margin of said seal and inserting it in said groove.

In witness whereof, we have hereunto signed our names.

FREDERICK C. LUNDELL.
CHARLES B. REGAN.